United States Patent [19]

Baade et al.

[11] Patent Number: 5,569,723

[45] Date of Patent: Oct. 29, 1996

[54] PROCESS FOR THE BROMINATION OF ALKYL RUBBERS

[75] Inventors: Wolfgang Baade, Wildeshausen; Heinrich Konigshofen, Bergisch Gladbach, both of Germany; Gabor Kaszas, Ontario, Canada

[73] Assignee: Bayer Aktiengesellschaft, Leverkusen, Germany

[21] Appl. No.: 543,138

[22] Filed: Oct. 13, 1995

[30] Foreign Application Priority Data

Oct. 24, 1994 [DE] Germany ............................ 44 37 931.5

[51] Int. Cl.$^6$ ...................................................... C08F 8/22
[52] U.S. Cl. ................... 525/357; 525/332.8; 525/332.9; 525/333.1; 525/333.2; 525/356; 525/358
[58] Field of Search ....................... 525/356, 357, 525/358

[56] References Cited

U.S. PATENT DOCUMENTS

| 3,607,846 | 9/1971 | Halasa et al. | 525/333.1 |
| 4,649,178 | 3/1987 | Gardner et al. | 525/332.8 |

FOREIGN PATENT DOCUMENTS

| 0566955 | 10/1993 | European Pat. Off. |
| 2616994 | 11/1977 | Germany. |

OTHER PUBLICATIONS

Chem. Abst. 92:111532u (Aug. 30, 1979).

*Primary Examiner*—Bernard Lipman
*Attorney, Agent, or Firm*—Connolly & Hutz

[57] ABSTRACT

$C_4$–$C_{16}$ alkyl rubbers are brominated by reacting the alkyl rubbers with bromine in the presence of organic azo compounds and/or alkali metal and/or alkaline earth metal hypochlorites and in the presence of linear, branched and/or cyclic alkanes and water at temperatures of 10° to 100° C., optionally under pressure, wherein the quantity of bromine is 0.2 to 1.2 times the molar quantity of double bonds contained in the rubber, 0.1 to 3 times the molar quantity of hypochlorite and/or azo compounds is used relative to the quantity of bromine used, providing that the concentration of the hypochlorites in an aqueous solution is 2 to 20 wt. %, and wherein 5 to 20 wt. % of water, 60 to 90 wt. % of alkanes and 5 to 25 wt. % of alkyl rubber are used relative to 100 wt. % of the total of alkyl rubber, alkanes and water.

5 Claims, No Drawings

PROCESS FOR THE BROMINATION OF ALKYL RUBBERS

The present invention relates to a process for improving the bromination of $C_4$–$C_{16}$ alkyl rubbers by reacting the alkyl rubbers with bromine in the presence of organic azo compounds and/or alkali metal and/or alkaline earth metal hypochlorites and in the presence of alkanes and water at temperatures of 10° to 100° C.

Alkyl rubbers, in particular butyl rubbers, are today customarily brominated by the direct addition of liquid bromine at temperatures of approximately 40° to 60° C. in the presence of hexane as solvent, frequently also in the presence of small quantities of water. In such brominations, one bromine atom from a bromine molecule is attached to the rubber while the other bromine atom of the molecule is reacted to HBr. After bromination, the resultant HBr is neutralised with sodium hydroxide solution and converted into sodium bromide (see, for example, Ullmanns Encyclopedia of Industrial Chemistry, volume A23, 1993).

It is known from U.S. Pat. No. 2,948,709, U.S. Pat. No. 3,182,275 and GB 867,737 that the bromine yield on bromination of alkyl rubbers synthesised from olefin and diolefin units may be considerably raised by the presence of oxidising substances, in particular by the presence of peroxides. However, functional groups containing oxygen are incorporated into the polymer in such brominations. Furthermore, branching of the polymers generally occurs. According to GB 867,737, such modification of the polymers to give an oxygen content of up to 2% in the polymer is desired for some applications. However, for the standard use of butyl rubber, for example for tire inner liners, the introduction of functional groups containing oxygen, for example carbonyl groups, which occurs with prior art oxidising compounds and the accordingly used reaction conditions, is disadvantageous as such incorporation impairs the gas impermeability of the vulcanisates produced from the brominated butyl rubber, which is of course disadvantageous for use as tire inner liners.

It has surprisingly now been found that an improvement in bromine yield is achieved under certain reaction conditions in the presence of weak oxidising agents, without functional groups containing oxygen being incorporated into the polymer or the polymer being modified in another manner. The product properties of the brominated butyl rubbers produced in this manner are comparable with the product properties of brominated butyl rubbers produced using known standard processes.

The present invention thus provides a process for the bromination of $C_4$–$C_{16}$ alkyl rubbers which is characterised in that the alkyl rubbers are reacted with bromine in the presence of organic azo compounds and/or alkali metal and/or alkaline earth metal hypochlorites and in the presence of linear, branched and/or cyclic alkanes and water at temperatures of 10° to 100° C., optionally under pressure, wherein the quantity of bromine is 0.2 to 1.2 times the molar quantity of double bonds contained in the rubber, 0.1 to 3 times the molar quantity of hypochlorite and/or azo compound is used relative to the quantity of bromine used, providing that the concentration of the hypochlorites in an aqueous solution is 2 to 20 wt. %, and wherein 5 to 20 wt. % of water, 60 to 90 wt. % of alkanes and 5 to 25 wt. % of alkyl rubber are used relative to 100 wt. % of the total of alkyl rubber, alkanes and water.

The process according to the invention is preferably performed at temperatures of 20° to 80° C. and at pressures of 0.8 to 10 bar.

The alkyl rubber used is synthesised from olefin and isoolefin units having 4 to 16 carbon atoms or other cationically copolymerisable, mono- or polyunsaturated organic compounds having 4 to 16 carbon atoms.

Isoolefins having 4 to 16, preferably 4 to 12 carbon atoms which may be used for synthesis are: isobutene, 2-methyl-butene, 3-methyl-1-butene and 4-methyl-1-pentene, preferably isobutene and 2-methylbutene, particularly preferably isobutene.

Conjugated diolefins having 4 to 16 carbon atoms which may be used are: butadiene, isoprene, piperylene, 2,3-dimethyl-butadiene, 2,4-dimethyl-1,3-pentadiene, cyclopentadiene, methylcyclopentadiene and 1,3-cyclohexadiene, preferably butadiene, isoprene, piperylene and 2,3-dimethylbutadiene, particularly preferably isoprene.

Cationically polymerisable, mono- or polyunsaturated organic compounds having 4 to 16 carbon atoms, preferably 4 to 10 carbon atoms, which may be used for synthesis of the alkyl rubbers are: styrene, p-methylstyrene, divinylbenzene and dimethylfulvene, preferably styrene, p-methylstyrene and divinylbenzene, in particular p-methylstyrene and divinylbenzene.

The bromine is used in liquid form preferably in 0.3 to 0.9 times the molar quantity relative to the double bonds contained in the rubber.

Alkanes which may be considered are those having 4 to 12 carbon atoms, particularly preferably 5 to 9 carbon atoms. Examples which may be cited are: pentanes, hexanes, cyclohexane and heptanes, very particularly preferably isohexane and n-hexane. The quantity of alkanes used is preferably 60 to 85 wt. % relative to the total of alkyl rubber, alkanes and water.

Water is used in the process according to the invention preferably in a quantity of 5 to 15 wt. %, again relative to the total of alkyl rubber, alkanes and water. The quantity of alkyl rubber used for bromination is preferably 10 to 20 wt. %, relative to the total of alkyl rubber, alkanes and water. It should be noted in this connection that the quantity of alkanes, water and alkyl rubber adds up to 100 wt. %.

Organic azo compounds which may be considered for the process according to the invention are: azodiisobutyronitrile, azodimethylvaleronitrile or other non-colouring organic azo compounds, in particular azodiisobutyronitrile.

Alkali metal or alkaline earth metal hypochlorites which are used are, for example: sodium hypochlorite, potassium hypochlorite or magnesium hypochlorite, in particular sodium hypochlorite. The hypochlorites and azo compounds may be used both individually and mixed together. The alkali metal and/or alkaline earth metal hypochlorites are particularly preferably used in the process according to the invention.

The organic azo compounds and/or the alkali metal or alkaline earth metal hypochlorites and preferably used in 0.4 to 0.9 times the molar quantity relative to the quantity of bromine used.

It is of particular significance to the process according to the invention that the alkali metal and/or alkaline earth metal hypochlorites do not exceed a certain concentration in the aqueous solution. A concentration of alkali metal and/or alkaline earth metal hypochlorites of 5 to 15 wt. % in water is thus preferred.

The process according to the invention may be performed both continuously and discontinuously.

The brominated alkyl rubbers obtained may be finished in the customary manner, for example by precipitation of the polymers in methanol or water (neutral to alkaline) or by stripping the polymer slurry, i.e. coagulation of the polymer particles with steam and coagulation auxiliaries. The residual monomers remaining in the product are stripped out with steam. The brominated alkyl rubber is then mechanically separated from the aqueous phase and dried.

The process according to the invention is generally performed as follows:

The stated quantity of bromine and the stated quantity of hypochlorite and/or azo compound are vigorously stirred into a solution of alkyl rubber in hexane containing small quantities of water with exclusion of light and under nitrogen at 40° to 60° C. This solution is then intensively stirred for up to 5 minutes and immediately thereafter precipitated with water adjusted to pH 9.5 with sodium hydroxide solution. Finishing is then performed in the above-described manner.

The brominated alkyl rubber obtained using the process according to the invention exhibits no change in the molar mass of the polymer unit, in the degree of branching or in the solution viscosity in comparison with the alkyl rubber introduced into the process; neither are any functional groups containing oxygen or nitrogen incorporated.

The following examples are intended to illustrate the invention. The comparative examples demonstrate the advantages of the process according to the invention over the prior art process.

EXAMPLES

Comparative Example 1

0.27 g of bromine and 0.39 g of a 30% aqueous solution of hydrogen peroxide were vigorously stirred with exclusion of light and under nitrogen at 45° C. into 150 g of a solution prepared from 22.5 g of butyl rubber, 112.5 g of hexane and 15 g of distilled water. The solution was intensively stirred for 5 minutes at 45° C. Immediately thereafter, the brominated butyl rubber was precipitated in 500 ml of distilled water adjusted to pH 9.5 with NaOH. The precipitated polymer was washed twice with 500 ml portions of distilled water and dried in a vacuum drying cabinet at 70° C. Bromine yield was determined by IR and NMR measurements and the bromide content of the waste water was also determined. The addition of hydrogen peroxide brought about a 37% improvement in bromine yield in comparison with bromination without added hydrogen peroxide. Carbonyl functional groups were, however, found in the brominated butyl rubber, as was an increase in polymer branching from 4 to 15% (increase of relative solution viscosity from 135 ml/g to 154 ml/g).

Comparative Example 2

Comparative example 1 was repeated with 0.06 g of a 5% aqueous solution of hydrogen peroxide. The improvement in bromine yield in comparison with bromination without added hydrogen peroxide was 17%. Carbonyl functional groups were again found in the brominated butyl rubber, but there was no change in polymer branching.

Comparative Example 3

Comparative example 1 was repeated with 0.13 g of a 25% aqueous solution of NaOCl. A 30% increase in bromine yield in comparison with the reaction without added NaOCl was found. Here too, carbonyl functional groups were found in the IR spectrum, although in smaller amounts. The relative solution viscosity had risen from 135 ml/g to 145 ml/g.

EXAMPLE 1

0.67 g of bromine and 0.1 g of azodiisobutyronitrile were vigorously stirred with exclusion of light and under nitrogen at 45° C. into 150 g of a solution prepared from 22.5 g of butyl rubber, 112.5 g of hexane and 15 g of distilled water. The solution was intensively stirred for 5 minutes at 45° C. Immediately thereafter, the brominated butyl rubber was precipitated in 500 ml of distilled water adjusted to pH 9.5 with NaOH. The precipitated polymer was washed twice with 500 ml portions of distilled water and dried in a vacuum drying cabinet at 70° C. Bromine yield was determined by IR and NMR measurements and the bromide content of the waste water was also determined. The addition of azodiisobutyronitrile brought about a 41% improvement in bromine yield in comparison with bromination without added azodiisobutyronitrile. No functional groups containing oxygen were found in the brominated butyl rubber and the relative solution viscosity remained at 135 ml/g.

EXAMPLE 2

Example 1 was repeated with 0.27 g of bromine and 0.56 g of azodiisobutyronitrile at 55° C. The improvement in bromine yield was 63%. No carbonyl functional groups nor other functional groups containing oxygen were found in the brominated butyl rubber and the relative solution viscosity again remained at 135 ml/g.

EXAMPLE 3

Example 1 was repeated with 0.27 g of bromine and 0.13 g of NaOCl in the form of a 5% solution in water. According to NMR and IR measurements, the improvement in bromine yield was 58% and no carbonyl functional groups nor other functional groups containing oxygen were found in the brominated butyl rubber. The relative solution viscosity remained virtually unchanged and was 136 ml/g after bromination.

EXAMPLE 4

Example 1 was repeated with 0.40 g of bromine and 0.3 g of NaOCl in the form of a 10% solution in water. The improvement in bromine yield was 79%. No carbonyl functional groups nor other functional groups containing oxygen were found in the brominated butyl rubber. The relative solution viscosity remained unchanged at 135 ml/g and gel permeation chromatography revealed no differences in molar mass distribution before and after bromination.

We claim:

1. Process for the bromination of $C_4$–$C_{16}$ alkyl rubbers, characterised in that the alkyl rubbers are reacted with bromine in the presence of organic azo compounds and/or alkali metal and/or alkaline earth metal hypochlorites and in the presence of linear, branched and/or cyclic alkanes and water at temperatures of 10° to 100° C., optionally under pressure, wherein the quantity of bromine is 0.2 to 1.2 times the molar quantity of double bonds contained in the rubber, 0.1 to 3 times the molar quantity of hypochlorite and/or azo compound is used relative to the quantity of bromine used, providing that the concentration of the hypochlorites in an aqueous solution is 2 to 20 wt. %, and wherein 5 to 20 wt. % of water, 60 to 90 wt. % of alkanes and 5 to 25 wt. % of alkyl rubber are used relative to 100 wt. % of the total of alkyl rubber, alkanes and water.

2. Process according to claim 1, characterised in that it is performed in the presence of sodium hypochlorite, potassium hypochlorite and/or magnesium hypochlorite.

3. Process according to claim 1, characterised in that it is performed in the presence of azodiisobutyronitrile.

4. Process according to claim 1, characterised in that it is performed in the presence of pentanes, hexanes, cyclohexanes and/or heptanes.

5. Process according to claim 1, characterised in that it is performed at pressures of 0.8 to 10 bar.

* * * * *